Aug. 20, 1963 R. W. WETJEN 3,100,993

WATER METER

Filed May 3, 1960

INVENTOR.
Russell W Wetjen
BY Ralph Hammar
Attorney

3,100,993
WATER METER

Russell W. Wetjen, Buffalo, N.Y., assignor to Buffalo Meter Company, Incorporated, Buffalo, N.Y., a corporation of New York
Filed May 3, 1960, Ser. No. 26,488
2 Claims. (Cl. 73—258)

This invention is a nutating disc water meter with point contact roller bearing thrust surfaces for the disc.

Figure 1:
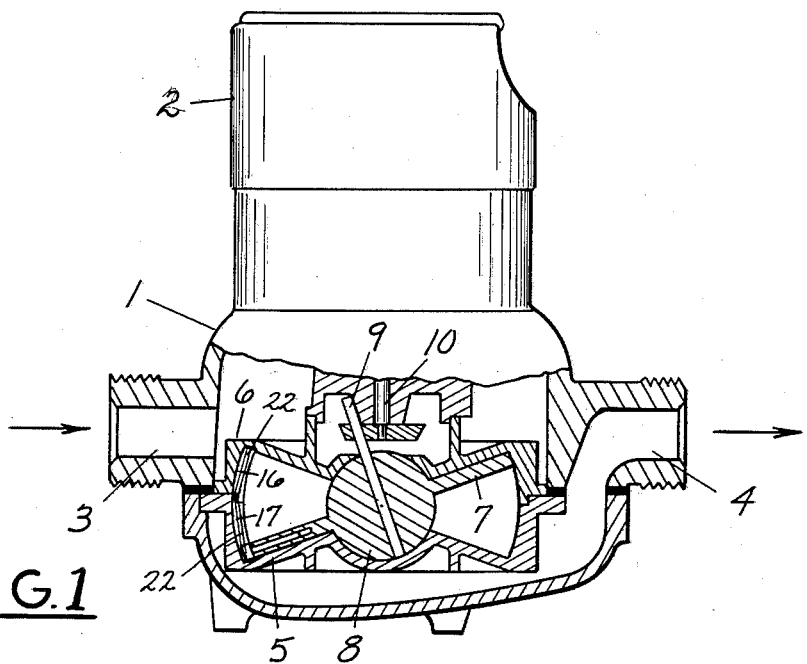
Figures 2, 3:
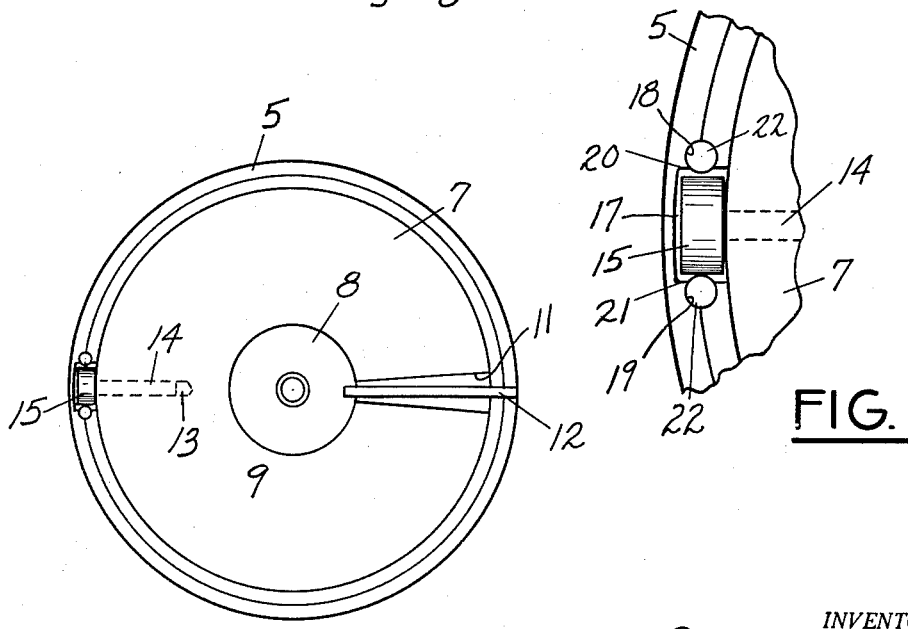

In the drawing, FIG. 1 is a sectional elevation of a water meter, FIG. 2 is a top plan view of the meter with the upper half of the casing removed, and FIG. 3 is an enlarged fragmentary view.

The common parts of the water meter are readily identified, 1 being the meter body or casing, 2 the meter register, 3 the inlet and 4 the outlet. The water flows through a measuring chamber comprising a lower housing 5, an upper housing 6, and a nutating disc piston 7 having a ball 8 at its center to which is fixed a stem 9 driving a shaft 10 connected through gearing (not shown) to the meter register. The parts so far described are or may be of common construction.

In one edge of the disc 7 is a slot 11 straddling a partition 12 separating the inlet and outlet of the measuring chamber. Opposite the slot 11 is a radial hole 13 rotatably receiving the stem 14 of a thrust roller having its head 15 received in aligned arcuate slots 16 and 17 in the upper and lower housing parts 5 and 6. The diameter of the head 15 has a free clearance in the slots 16 and 17. To take the thrust of the disc in either direction of rotation, straight holes 18 and 19 are drilled in the upper and lower housing parts 5 and 6 so as to partially intersect edges 20 and 21 of the slots 16 and 17, the width of the intersections being less than the diameter of the holes. In the holes are cylindrical inserts 22 of non-metallic bearing material such as hard rubber which provide point contact engagement with the head 15 of the thrust roller and thereby take the thrust of the disc with a minimum of friction. The head 15 does not simultaneously engage both inserts 22 but only engages one at a time, depending upon the direction of movement of the disc.

The inserts 22 being non-metallic reduce the meter noise. If wear should occur, the inserts may be removed and rotated to bring a new wearing surface into operative position. The drilled holes for the inserts are easy to machine and introduce no distortion in the working surface of the measuring chamber. Because there are separate inserts in the upper and lower halves of the measuring chamber, the inserts do not interfere with disassembly of the chamber.

What is claimed as new is:

1. In a nutating piston water meter, a measuring chamber having upper and lower parts, a nutating disc piston in the chamber, a radially extending thrust roller carried by said disc and having a head extending beyond the edge of the disc, said upper and lower parts having aligned arcuate slots receiving the head of the roller with sides of the slots on opposite sides of the head, a straight hole drilled in each of the upper and lower parts with the hole in the lower part adjacent one side of the slot in the lower part and with the hole in the upper part adjacent the corresponding side of the slot in the upper part, the major portion of the holes being outside said slots and each of said holes having an intersection with the side of the slot to which it is adjacent, said intersections being of width less than the diameter of the holes, and cylindrical inserts of non-metallic bearing material in said holes with surfaces projecting into the slots through the intersections of the holes with the sides of the slots to provide thrust bearing surfaces for the head of the roller.

2. In a liquid meter, a measuring chamber through which the liquid flows, said chamber, having upper and lower housing parts, a disc in the chamber, means supporting the disc for nutation by the liquid flowing through the chamber, a thrust roller journaled radially in the disc and having a head projecting radically beyond the peripheral edge of the disc, said upper and lower housing parts having aligned arcuate slots receiving the head of the roller with sides of the slots straddling and spaced on opposite sides of the head of the roller, a pair of straight holes drilled in each of the upper and lower parts with the holes in the lower part respectively adjacent one and the other of opposite sides of the slot in the lower part and with the holes in the upper part respectively adjacent one and the other of opposite sides of the slot in the upper part, the major portion of the holes being outside said slots and each of said holes having an intersection with the side of the slot to which it is adjacent, the width of the intersections being less than the diameter of the holes, cylindrical inserts of non-metallic bearing material in said holes partially projecting through said intersection to provide point contact engagement with the head of the roller to take the thrust of the disc.

References Cited in the file of this patent
UNITED STATES PATENTS

| | | |
|---|---|---|
| 618,193 | Thomson | Jan. 24, 1899 |
| 626,518 | Bassett | June 6, 1899 |
| 771,337 | Thomson | Oct. 4, 1904 |
| 856,244 | Gamon | June 11, 1907 |
| 1,073,387 | Bassett | Sept. 16, 1913 |
| 1,200,521 | Richards | Oct. 10, 1916 |
| 2,960,074 | Zavada | Nov. 15, 1960 |